United States Patent
Miyano

(10) Patent No.: US 9,348,497 B2
(45) Date of Patent: May 24, 2016

(54) ELECTRONIC DEVICE, AND HANDWRITING PROCESSING METHOD

(75) Inventor: Yasuhiro Miyano, Osaka (JP)

(73) Assignee: SHARP KABUSHIKI KAISHA, Osaka (JP)

(*) Notice: Subject to any disclaimer, the term of this patent is extended or adjusted under 35 U.S.C. 154(b) by 144 days.

(21) Appl. No.: 13/984,729

(22) PCT Filed: Feb. 3, 2012

(86) PCT No.: PCT/JP2012/052491
§ 371 (c)(1),
(2), (4) Date: Aug. 9, 2013

(87) PCT Pub. No.: WO2012/108350
PCT Pub. Date: Aug. 16, 2012

(65) Prior Publication Data
US 2013/0314362 A1  Nov. 28, 2013

(30) Foreign Application Priority Data
Feb. 10, 2011  (JP) .................................. 2011-027454

(51) Int. Cl.
*G06F 3/048* (2013.01)
*G06F 3/0485* (2013.01)
*G06F 3/0488* (2013.01)

(52) U.S. Cl.
CPC .......... *G06F 3/0485* (2013.01); *G06F 3/04883* (2013.01)

(58) Field of Classification Search
CPC .............. G06F 3/048; G06F 3/0484–3/04855; G06F 3/0487–3/04883
See application file for complete search history.

(56) References Cited

U.S. PATENT DOCUMENTS

| 5,448,475 A | 9/1995 | Senoo et al. |
| 6,256,009 B1 * | 7/2001 | Lui et al. ....................... 345/173 |
| 2012/0066638 A1 * | 3/2012 | Ohri ..................... G06F 3/04883 715/784 |

FOREIGN PATENT DOCUMENTS

| CN | 1221909 A | 7/1999 |
| CN | 101840519 A | 9/2010 |
| JP | 1-206916 A | 12/1989 |
| JP | 6-162001 A | 6/1994 |
| JP | 2001-42992 A | 2/2001 |
| JP | 2002-278700 A | 9/2002 |
| JP | 2004-110439 A | 4/2004 |
| JP | 2005-301406 A | 10/2005 |

OTHER PUBLICATIONS

Chinese Office Action dated Nov. 4, 2015 received in counterpart Chinese Application No. 20120008321.5 with an English Translation.

* cited by examiner

*Primary Examiner* — Nathan Danielsen
(74) *Attorney, Agent, or Firm* — Birch, Stewart, Kolasch & Birch, LLP

(57) ABSTRACT

There is provided an electronic device, handwriting processing method, and handwriting processing program, that allows a user to more conveniently and less cumbersomely input an instruction for scrolling. An electronic device includes a touchscreen panel and a processor for receiving a handwritten character input via the touchscreen panel, and causing the touchscreen panel to display the handwritten character thereon. When a predetermined shape is input via the touchscreen panel the processor causes the touchscreen panel to scroll a screen.

4 Claims, 7 Drawing Sheets

ELECTRONIC DEVICE, AND HANDWRITING PROCESSING METHOD

TECHNICAL FIELD

The present invention relates to an electronic device, a handwriting processing method, and a handwriting processing program, that allow a touchscreen panel to display text thereon.

BACKGROUND ART

There is a technique known to allow a touchscreen panel to receive and display handwritten characters, hand-drawn images and the like thereon. Furthermore, there is also a technique known to allow a touchscreen panel to receive an instruction to scroll a screen.

For example, Japanese Patent Laying-Open No. 1-306916 (PTD 1) discloses a graphics input device. According to Japanese Patent Laying-Open No. 1-306916 (PTD 1), an input control unit detects x and y coordinate values and a comparison and determination unit compares the values to determine whether the values fall within a prescribed area in which a graphic input is valid. If the values do not fall within that area, then in what direction the values deviate from the area is considered and accordingly a scroll control unit issues an instruction to a display control unit to scroll a screen in an upward, downward, rightward or leftward direction to thus scroll the screen. If the values fall within the area, the display control unit writes a point that corresponds to the values to a memory and also displays the point on an LCD. Automatic scrolling in a handwritten system is thus implemented. This provides improved operability.

Furthermore, Japanese Patent Laying-Open No. 2001-42992 (PTD 2) discloses a handwritten character processing device and method. According to Japanese Patent Laying-Open No. 2001-42992 (PTD 2), a handwritten input character is recognized and a result thereof is used to edit a document which is in turn displayed in a document display area, which also displays a character input area overlapping the document display area and allowing a handwritten input character to be displayed therein in realtime. If a cursor exists in the area for indicating data in a document displayed in the area, the cursor is relocated outside the area by scrolling the document in the area upward or downward and thus displaying the document. This liberates the user from a scroll operation and thus provides improved utility.

Furthermore, Japanese Patent Laying-Open No. 2005-301406 (PTD 3) discloses a character input device and a method for controlling displaying an input frame. According to Japanese Patent Laying-Open No. 2005-301406 (PTD 3), the character input device includes a character recognition means to recognize a character based on a handwritten input done in the input frame and detected by an input reception means. In response to an input handwritten in a prescribed input frame, as detected by the input reception means, or pressing of a right/left scrolling button, as detected by a scrolling reception means, an input frame scrolling means performs automatic scrolling, leftward scrolling or rightward scrolling as scrolling the input frame displayed on a display screen. A display processing means displays on the display screen a resultantly recognized character and a resultant scrolling.

CITATION LIST

Patent Documents

PTD 1: Japanese Patent Laying-Open No. 01-306916
PTD 2: Japanese Patent Laying-Open No. 2001-42992
PTD 3: Japanese Patent Laying-Open No. 2005-301406

SUMMARY OF INVENTION

Technical Problem

However, there is a demand for a more convenient and less cumbersome method for inputting an instruction for scrolling.

The present invention has been made to address such an issue, and it contemplates an electronic device, a handwriting processing method, and a handwriting processing program, that allow a user to more conveniently and less cumbersomely input an instruction for scrolling.

Solution to Problem

The present invention in one aspect provides an electronic device including: a touchscreen panel; and a processor for receiving a handwritten character input via the touchscreen panel, and causing the touchscreen panel to display the handwritten character thereon. The processor causes the touchscreen panel to scroll a screen when a predetermined shape is input via the touchscreen panel.

Preferably, the processor determines that the predetermined shape is input when the processor detects that a period is input.

Preferably, the processor determines that the predetermined shape is input when the processor detects that a comma is input.

Preferably, when the predetermined shape is input via the touchscreen panel the processor causes the touchscreen panel to scroll the screen by a width, as seen in a scroll direction, of an area surrounding a handwritten character input after an immediately previous scroll operation is performed before the predetermined shape is input.

Preferably, when the predetermined shape is input, the processor determines whether there is a blank area having the width behind the predetermined shape, and if the blank area having the width is present, the processor scrolls the screen, whereas if the blank area having the width is absent, the processor does not scroll the screen.

The present invention in another aspect provides a handwriting processing method performed in an electronic device including a touchscreen panel and a processor. The method includes the steps of: receiving, by the processor, a handwritten character input via the touchscreen panel; causing, by the processor, the touchscreen panel to display the handwritten character thereon; and in response to a predetermined shape being input via the touchscreen panel, causing, by the processor, the touchscreen panel to scroll a screen.

The present invention in another aspect provides a handwriting processing program for an electronic device including a touchscreen panel and a processor. The program causes the processor to perform the steps of: receiving a handwritten character input via the touchscreen panel; causing the touchscreen panel to display the handwritten character thereon; and in response to a predetermined shape being input via the touchscreen panel, causing the touchscreen panel to scroll a screen.

Advantageous Effect of Invention

The present invention can thus provide an electronic device, a handwriting processing method, and a handwriting processing program, that allow a user to more conveniently and less cumbersomely input an instruction for scrolling.

DESCRIPTION OF EMBODIMENTS

Figure 1:
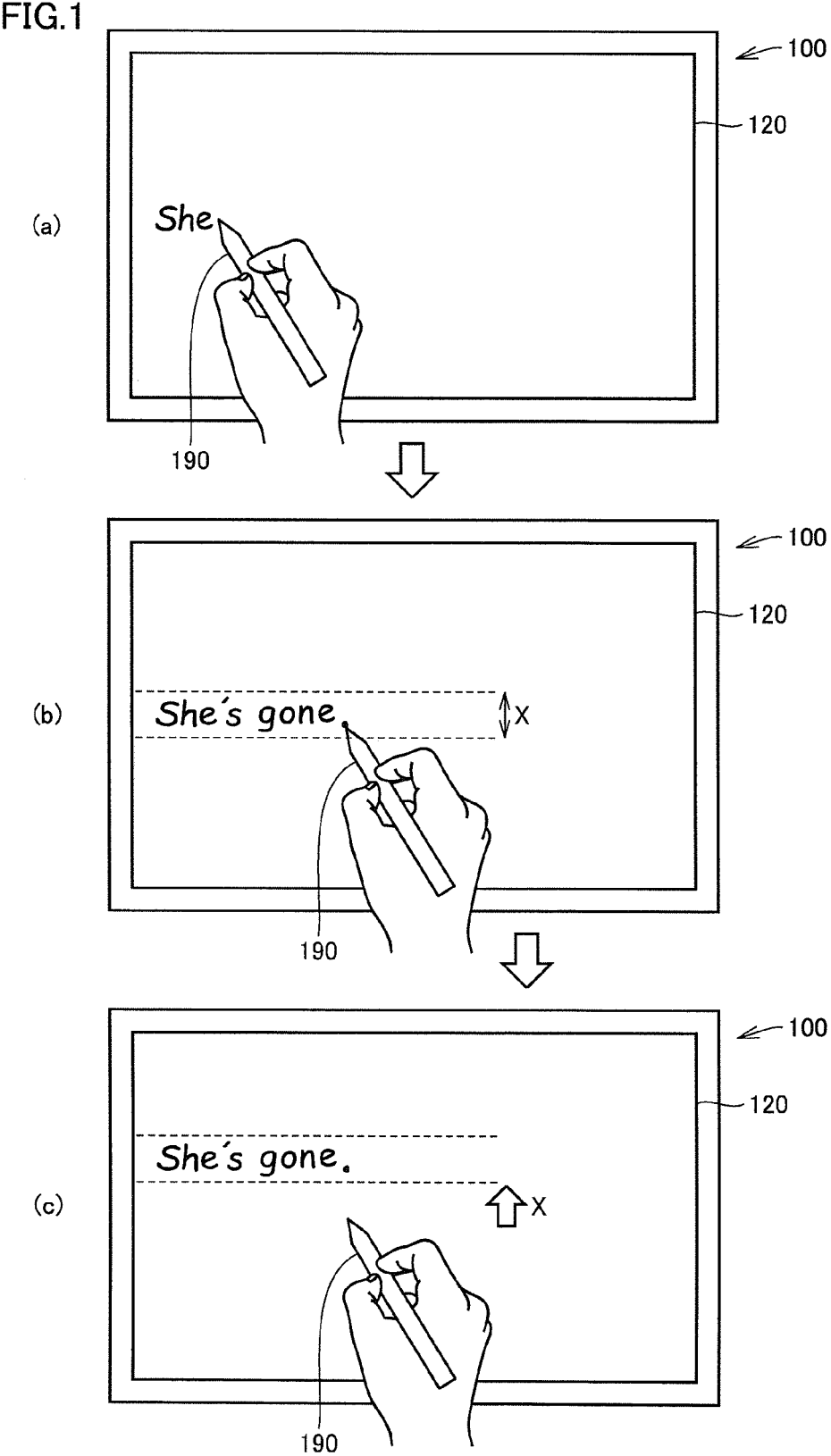
FIG. 1 outlines how an electronic note 100 according to an embodiment operates when it receives one line of handwritten characters and a handwritten period.

Hereinafter reference will be made to the drawings to describe the present invention in embodiments. In the following description, identical components are denoted by identical reference characters. Their names and functions are also identical. Accordingly, they will not be described repeatedly in detail. In the following description an electronic note is described as a representative example of an "electronic device." It should be noted, however, that the "electronic device" can also be implemented as a personal computer, a mobile phone, a personal digital assistant (PDA), or a similar information terminal having a touchscreen panel.

<Outlining How Electronic Note 100 Operates>

First will be outlined how an electronic note 100 according to an embodiment operates when it receives one line of handwritten characters and a handwritten period (or comma). FIG. 1 outlines how electronic note 100 according to the embodiment operates when it receives one line of handwritten characters and a handwritten period. More specifically, FIG. 1(a) shows a user handwriting and thus inputting characters to electronic note 100. FIG. 1(b) shows the user inputting a period to the electronic note. FIG. 1(c) shows the electronic note having scrolled a screen.

With reference to FIG. 1(a), the user inputs a handwritten character to electronic note 100 via a touchscreen panel 120. Specifically, the user inputs the handwritten character by sliding a stylus pen 190 on touchscreen panel 120. Electronic note 100 displays a line along a locus of stylus pen 190 to display a handwritten image representing a character, graphics and/or the like.

With reference to FIG. 1(b), after the user inputs one line of handwritten characters via touchscreen panel 120, the user inputs a period "." to electronic note 100. Specifically, the user inputs the period "." by sliding stylus pen 190 on touchscreen panel 120. Electronic note 100 displays a line along a locus of stylus pen 190 to display a handwritten image representing the period ".".

With reference to FIG. 1(c), electronic note 100 detects via touchscreen panel 120 that the period "." has been input. Electronic note 100 scrolls the screen only by a height X of an area surrounding one line of handwritten characters input after the immediately previous scroll operation is performed (or after a handwriting application is initiated) before the period is input. In other words, electronic note 100 scrolls the screen only by a width X of the area of the handwritten characters as seen in a scroll direction. Note that hereinafter an amount (to be) scrolled that is represented by "height X" and "width X" will also be referred to as an "amount (to be) scrolled X".

Figure 2:
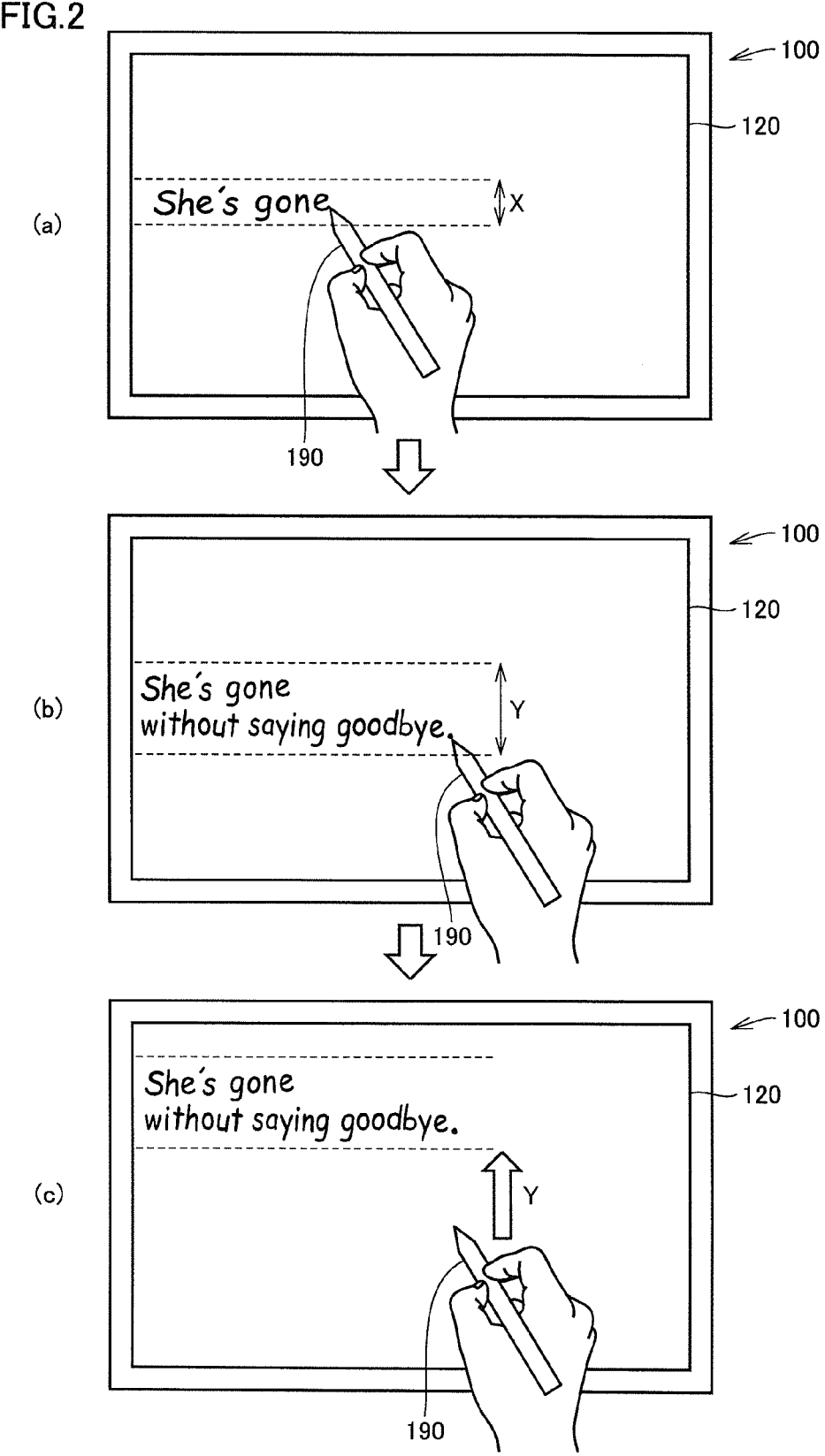
FIG. 2 outlines how electronic note 100 according to an embodiment operates when it receives two lines of handwritten characters and a handwritten period.

Then will be outlined how electronic note 100 according to the present embodiment operates when it receives two lines of handwritten characters and a handwritten period (or comma). FIG. 2 outlines how electronic note 100 according to the present embodiment operates when it receives two lines of handwritten characters and a handwritten period. More specifically, FIG. 2(a) shows a user handwriting and thus inputting characters to electronic note 100. FIG. 2(b) shows the user inputting a period to the electronic note. FIG. 2(c) shows the electronic note having scrolled a screen.

With reference to FIG. 2(a), the user inputs a handwritten character to electronic note 100 via touchscreen panel 120. Specifically, the user inputs the handwritten character by sliding stylus pen 190 on touchscreen panel 120. Electronic note 100 displays a line along a locus of stylus pen 190 to display a handwritten image representing a character, graphics and/or the like.

With reference to FIG. 2(b), after the user inputs two lines of handwritten characters via touchscreen panel 120, the user inputs a period "." to electronic note 100. Specifically, the user inputs the period "." by sliding stylus pen 190 on touchscreen panel 120. Electronic note 100 displays a line along a locus of stylus pen 190 to display a handwritten image representing the period ".".

With reference to FIG. 2(c), electronic note 100 detects via touchscreen panel 120 that the period "." has been input. Electronic note 100 scrolls the screen only by a height Y of an area surrounding two lines of handwritten characters input after the immediately previous scroll operation is performed (or after the handwriting application is initiated) before the period is input. In other words, electronic note 100 scrolls the screen only by a width Y of the area of the handwritten characters as seen in the scroll direction. Note that hereinafter an amount (to be) scrolled that is represented by "height Y" and "width Y" will also be referred to as an "amount (to be) scrolled Y".

The user can thus continue to input handwritten characters without moving his/her hand in the scroll direction. This is particularly effective when it is difficult to slide the palm on the surface of touchscreen panel 120. Furthermore, the user no longer needs to input an instruction for scrolling apart from that for inputting a handwritten character. In other words, the user can more easily and less cumbersomely input the instruction for scrolling.

Note that while in the present embodiment electronic note 100 is described as scrolling a screen in response to a period being input, it is not limited as such. Electronic note 100 may scroll the screen in response to a comma being input or in response to a period and a comma. In other words, electronic note 100 may scroll the screen in response to a character, an image or the like of a predetermined shape being input. Note that it is more efficient if electronic note 100 scrolls the screen responsively when a punctuation mark or a similar character, image or the like input, displayed or the like to mean punctuating a sentence or what the sentence means is input.

To implement such a function, electronic note 100 is specifically configured, as will be described hereinafter.

<Hardware Configuration of Electronic Note 100>

Figure 3:
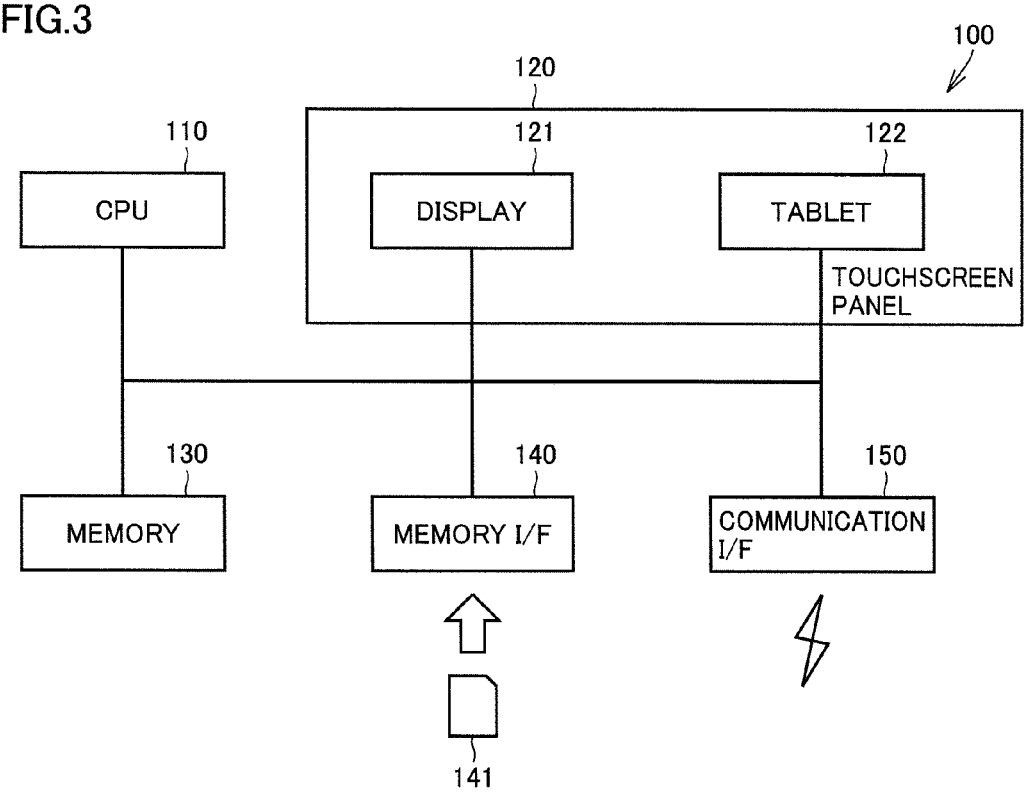
FIG. 3 is a block diagram representing a hardware configuration of electronic note 100.

Electronic note 100 is specifically configured in one manner, as will be described hereinafter. FIG. 3 is a block diagram representing a hardware configuration of electronic note 100. With reference to FIG. 3, electronic note 100 includes a CPU 110, touchscreen panel 120, a memory 130, a memory interface 140, and a communication interface 150 as main components.

Touchscreen panel 120 includes a display 121 and a tablet 122. Touchscreen panel 120 may be any type of a resistance film system, a surface acoustic wave system, an infrared system, an electromagnetic induction system, and a capacitive sensing system, and the like. Touchscreen panel 120 may include optical sensor liquid crystal.

Touchscreen panel 120 detects an operation of touching touchscreen panel 120 by an external object whenever a predetermined time arrives, and touchscreen panel 120 accordingly inputs a touched coordinate (or a contact coordinate) to CPU 110. In other words, CPU 110 obtains touched coordinates successively from touchscreen panel 120. Touchscreen panel 120 operates in response to an instruction (or signal) received from CPU 110 to display a character, an image and/or the like.

Memory 130 is implemented as a variety of random access memory (RAM), read-only memory (ROM), a hard disk, and/or the like. Memory 130 stores: a program executed by CPU 110; time series data of touched coordinates input via touchscreen panel 120 (handwriting data 131); topmost coordinate data 132 and bottommost coordinate data 133 of any touches detected after the immediately previous scroll operation by the current time; and the like. In other words, CPU 110 controls each component of electronic note 100 by executing the program stored in memory 130.

Memory interface 140 reads data from an external storage medium 141. In other words, CPU 110 reads via memory interface 140 the data stored in external storage medium 141, and stores that data to memory 130. CPU 110 also reads data from memory 130 and stores the data to external storage medium 141 via memory interface 140.

Note that storage medium 141 includes compact disc-read only memory (CD-ROM), digital versatile disk-read only memory (DVD-ROM), universal serial bus (USB) memory, a memory card, a flexible disk (FD), a hard disk, magnetic tape, cassette tape, a magnetic optical disc (MO), a mini disc (MD), an integrated circuit (IC) card (excluding the memory card), an optical card, mask ROM, EPROM, electronically erasable programmable read-only memory (EEPROM), and a similar medium allowing a program to be stored therein in a non volatile manner.

Communication interface 150 is implemented as an antenna, a connector and/or the like. Communication interface 150 communicates data with another device via a cable or wirelessly. In other words, via communication interface 150, CPU 110 receives a program, image data, text data and the like from another device and transmits image data, text data and the like to another device.

CPU 110 controls each component of electronic note 100 by executing a program stored in memory 130 or storage medium 141. In other words, by executing the program stored in memory 130 or storage medium 141, CPU 110 implements the functional block shown in FIG. 4 and performs the process represented in FIG. 8.

Figure 4:
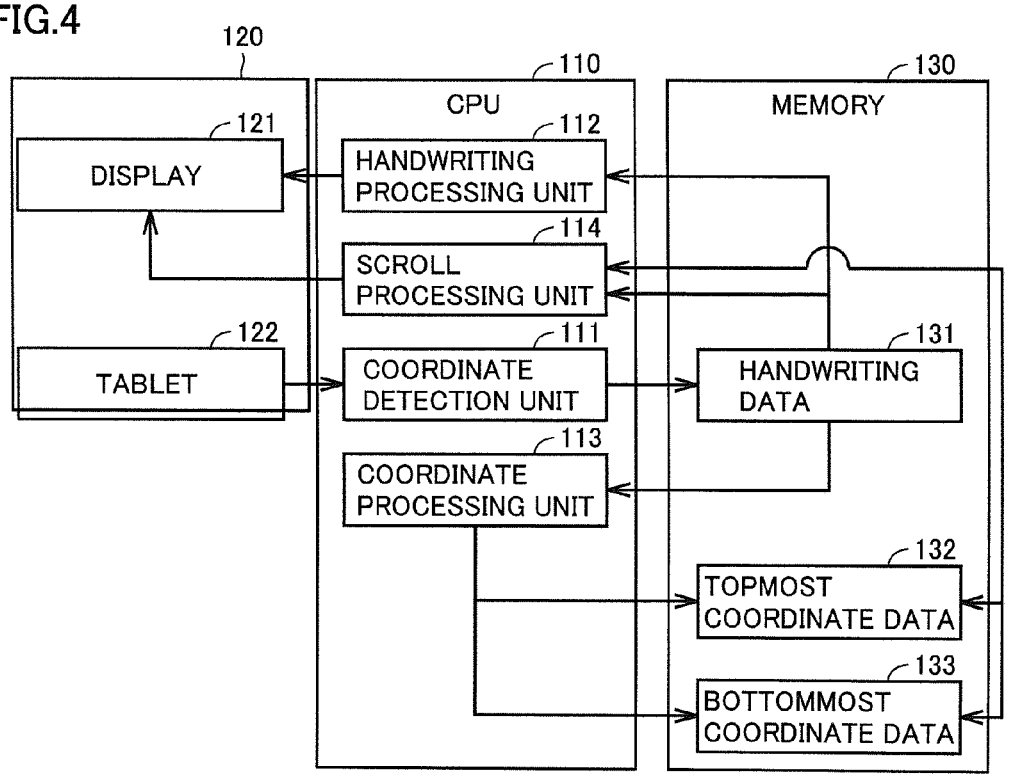
FIG. 4 is a block diagram representing a functional configuration of electronic note 100 according to the present embodiment.

Hereinafter will be described a functional configuration that electronic note 100 has. FIG. 4 is a block diagram representing a functional configuration of electronic note 100 according to the present embodiment.

With reference to FIG. 4, memory 130 stores handwriting data 131, topmost coordinate data 132, and bottommost coordinate data 133. CPU 110 executes a program stored in memory 130 to implement a coordinate detection unit 111, a coordinate processing unit 113, a handwriting processing unit 112, and a scroll processing unit 114.

Note that in the present embodiment coordinate detection unit 111, handwriting processing unit 112, coordinate processing unit 113, and scroll processing unit 114 are implemented by CPU 110 executing the program. However, coordinate detection unit 111, handwriting processing unit 112, coordinate processing unit 113, and scroll processing unit 114 may be implemented by dedicated hardware circuitry.

Initially, coordinate detection unit 111 obtains a contact coordinate of an external object on touchscreen panel 120, as based on a signal received from tablet 122. Coordinate detection unit 111 stores the obtained contact coordinate to memory 130 successively as time series data (or handwriting data 131). Coordinate detection unit 111 may associate a coordinate of a handwritten image with the type of the pen selected, and thus store them in memory 130.

Handwriting processing unit 112 causes touchscreen panel 120 to display a locus of the contact coordinate, as based on handwriting data 131. Thus when the locus of the contact coordinate represents a character, graphic and/or the like, the user can recognize the character, graphic and/or the like displayed on touchscreen panel 120. When the screen is scrolled as will be described hereinafter, handwriting processing unit 112 moves the locus of the contact coordinate, or a handwritten character, to accommodate the amount scrolled and thus displays it (i.e., moves it in parallel).

Coordinate processing unit 113 stores to memory 130 as topmost coordinate data 132 a contact coordinate detected after the immediately previous scroll operation is performed (or after the handwriting application is initiated) that is located frontmost in the scroll direction. Coordinate processing unit 113 stores to memory 130 as bottommost coordinate data 133 a contact coordinate detected after the immediately previous scroll operation is performed (or after the handwriting application is initiated) that is located rearmost in the scroll direction.

Figure 5:
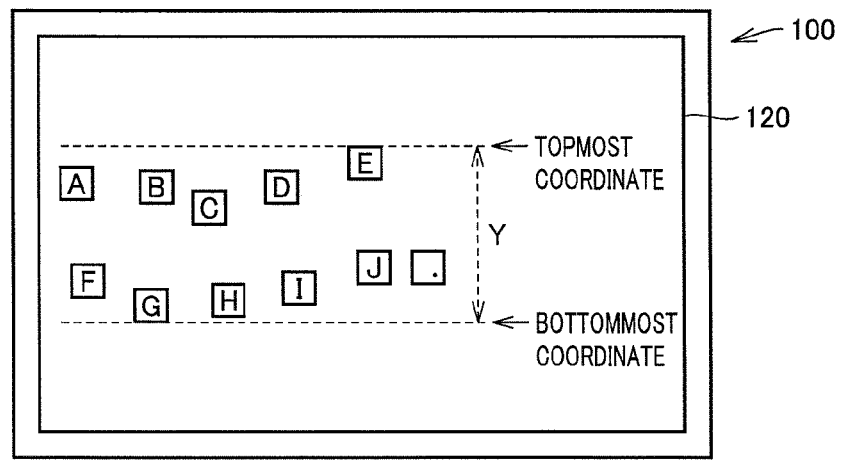
FIG. 5 illustrates topmost and bottommost coordinates and an amount scrolled Y according to the present embodiment.

FIG. 5 illustrates topmost and bottommost coordinates and amount scrolled Y according to the present embodiment. With reference to FIG. 4 and FIG. 5, for example if a page is followed by a next page (or scrolled) in a downward direction (or the y direction), coordinate processing unit 113 stores a contact coordinate that is located topmost as topmost coordinate data 132 to memory 130. Coordinate processing unit 113 also stores a contact coordinate that is located bottommost as bottommost coordinate data 133 to memory 130.

If a page is followed by a next page (or scrolled) in a leftward direction (or the x direction), coordinate processing unit 113 stores a contact coordinate that is located rightmost as topmost coordinate data 132 to memory 130. Coordinate processing unit 113 also stores a contact coordinate that is located leftmost as bottommost coordinate data 133 to memory 130.

Scroll processing unit 114 determines based on handwriting data 131 whether the locus of the contact coordinate indicates a predetermined shape. In the present embodiment, scroll processing unit 114 causes touchscreen panel 120 to scroll the screen if it is determined that a period "." is input via touchscreen panel 120. More specifically, scroll processing unit 114 determines whether the period "." is input, as based on the locus of the contact coordinate as detected and its position relative to a character located therearound (in front thereof, in particular).

Scroll processing unit 114 determines amounts to be scrolled X and Y based on topmost coordinate data 132 and bottommost coordinate data 133. Note that scroll processing unit 114 resets topmost coordinate data 132 and bottommost coordinate data 133 when the screen is scrolled.

For example, if a page is followed by a next page (or scrolled) in the downward direction (or the y direction), scroll processing unit 114 calculates a distance between the topmost and bottommost contact coordinates that are obtained after the immediately previous scroll operation is performed, as based on topmost coordinate data 132 and bottommost coordinate data 133, as amounts to be scrolled X and Y. If a page is followed by a next page (or scrolled) in the leftward direction (or the x direction), coordinate processing unit 113 calculates a distance between the rightmost and leftmost contact coordinates that are obtained after the immediately previous scroll operation is performed, as based on topmost coordinate data 132 and bottommost coordinate data 133, as an amount to be scrolled.

Figure 6:
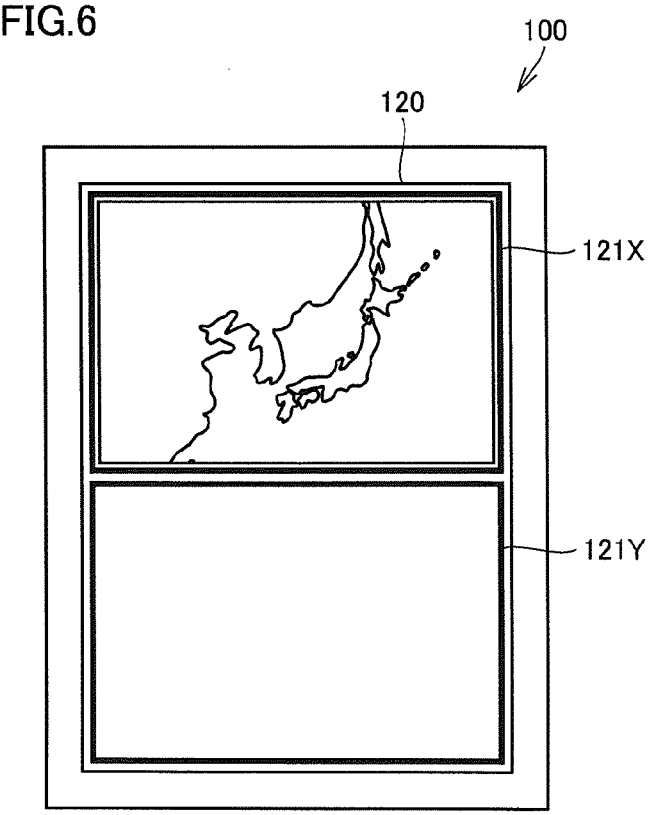
FIG. 6 illustrates a first case without scrolling.
Figure 7:
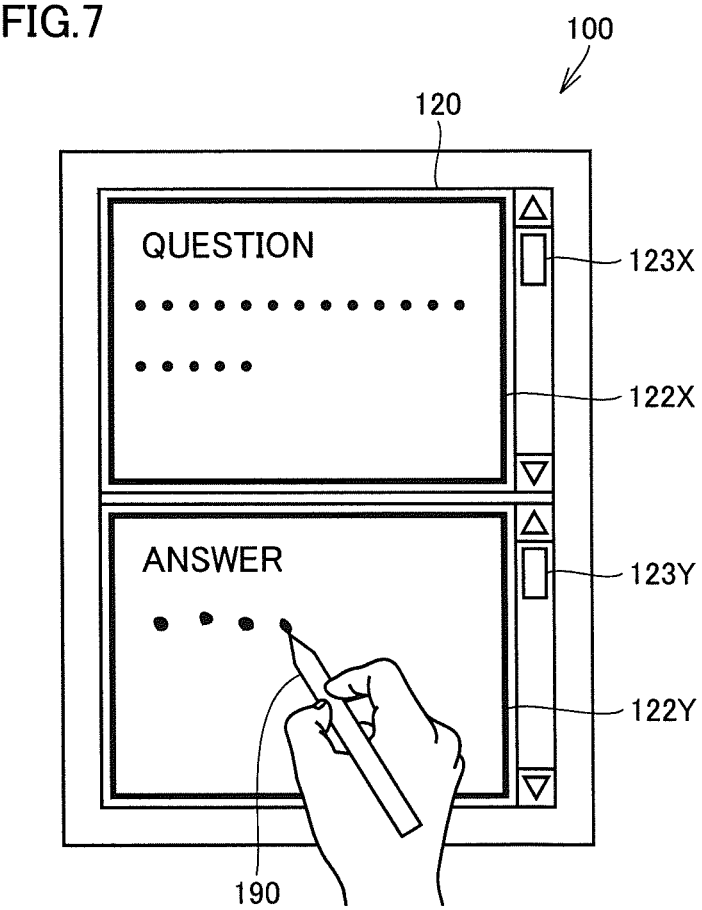
FIG. 7 illustrates a second case without scrolling.

Hereinafter will be described an example in which it is more preferable to avoid the above described automatic scroll process depending on a period (or a comma). FIG. 6 illustrates a first case without scrolling. FIG. 7 illustrates a second case without scrolling.

With reference to FIG. 6, in the present embodiment, CPU 110 or scroll processing unit 114 does not perform the automatic scroll process depending on a period for a handwritten character input on touchscreen panel 120 at an area 121X with an image displayed therein. In contrast, CPU 110 or scroll processing unit 114 performs the automatic scroll process depending on a period for a handwritten character input on touchscreen panel 120 at an area 121Y with no image displayed therein.

With reference to FIG. 7, in the present embodiment, CPU 110 or scroll processing unit 114 does not perform the automatic scroll process depending on a period for a handwritten character input on touchscreen panel 120 at an area 122X with a question displayed therein. In contrast, CPU 110 or scroll processing unit 114 performs the automatic scroll process depending on a period for a handwritten character input on touchscreen panel 120 at an area 122Y provided for receiving an answer.

Note that, for FIG. 7, CPU 110 receives an instruction from the user via a scroll bar 123X for scrolling a screen for area 122X displaying the question. Similarly, CPU 110 also receives an instruction from the user via a scroll bar 123Y for scrolling a screen for area 122Y provided for receiving the answer.

<Handwriting Processing>

Figure 8:
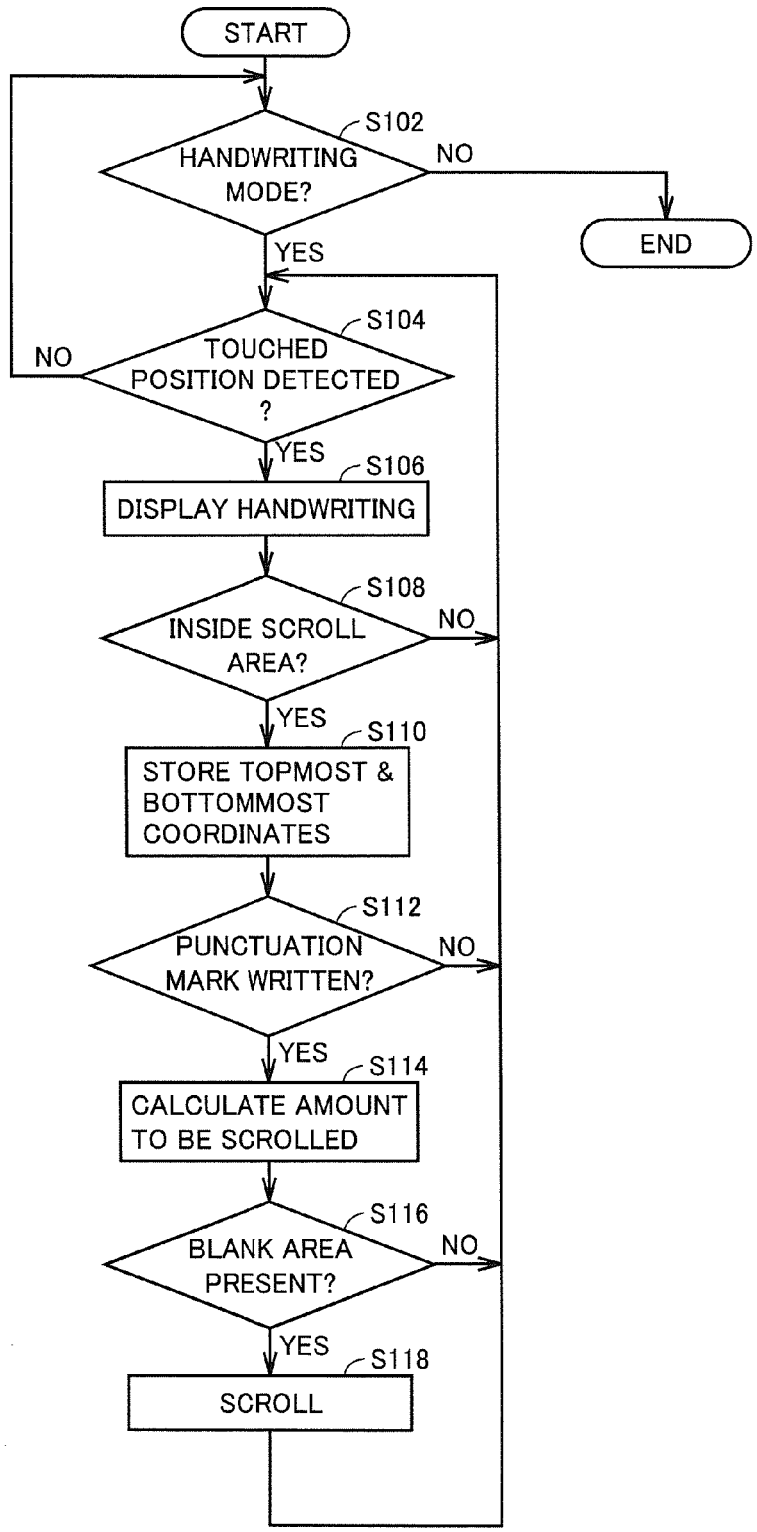
FIG. 8 is a flowchart of a handwriting processing according to the present embodiment.

CPU 110 performs a handwriting processing, as will be described hereinafter. FIG. 8 is a flowchart of a handwriting processing according to the present embodiment.

With reference to FIG. 8, CPU 110 determines whether a handwriting mode is selected (Step S102). For example, CPU 110 determines which one is selected from a mode allowing stylus pen 190 or the like to be used to handwrite and thus input a character, a mode allowing a software button to be used to input a character, and a mode allowing a hardware button to be used to input a character. If the handwriting mode is not selected (NO in Step S102), CPU 110 ends the handwriting processing.

If the handwriting mode is selected (YES in Step S102), CPU 110 detects a contact coordinate via touchscreen panel 120. If no contact coordinate can be detected (NO in Step S104) CPU 110 repeats Step S102 et seq.

If any contact coordinate is detected (YES in Step S104), CPU 110 causes touchscreen panel 120 to vary a manner of displaying a position corresponding to that contact coordinate (e.g., brightness) (Step S106). More specifically, CPU 110 stores the contact coordinate to memory 130 as handwriting data 131. Then, CPU 110 causes touchscreen panel 120 to display an input handwritten character along handwriting data 131 (or the locus of the contact coordinate).

CPU 110 determines whether the contact coordinate is located inside a scroll area (an area for which the automatic scroll process should be performed) (Step S108). If the contact coordinate is located outside the scroll area (NO in Step S108) CPU 110 repeats Step S104 et seq.

If the contact coordinate is located inside the scroll area (YES in Step S108) CPU 110 updates topmost coordinate data 132 and bottommost coordinate data 133 in memory 130, as based on the current contact coordinate (Step S110). CPU 110 determines based on handwriting data 131 whether a period has been handwritten (Step S112). If no period is handwritten (NO in Step S112) CPU 110 repeats Step S104 et seq.

If a period is handwritten (YES in Step S112), CPU 110 calculates amounts to be scrolled X and Y based on topmost coordinate data 132 and bottommost coordinate data 133 stored in memory 130 (Step S114). Once an amount to be scrolled has been determined, CPU 110 resets topmost coordinate data 132 and bottommost coordinate data 133 in memory 130.

CPU 110 determines whether an area surrounding a handwritten character, image and/or the like input after the immediately previous scroll operation is performed is followed therebehind (or therebelow) by a blank area having a width (or an extent) corresponding to the amount that is scrolled (Step S116). If there is no blank area having the width corresponding to the amount that is scrolled (NO in Step S116), i.e., if the area surrounding the handwritten character input after the immediately previous scroll operation is performed is followed therebehind by a handwritten character, image and/or the like, CPU 110 performs Step S104 et seq.

If there is a blank area having the width corresponding to the amount that is scrolled (YES in Step S116), i.e., if the area surrounding the handwritten character input after the immediately previous scroll operation is performed is not followed therebehind by any handwritten character, image or the like, CPU 110 causes touchscreen panel 120 to scroll the screen only by the amount to be scrolled (Step S118). CPU 110 repeats step S104 et seq.

Note that, to more reliably determine whether a period or a predetermined shape has been input, CPU 110 may perform the following process:

If CPU 110 determines that a period "." has been input (YES in Step S112), and then thereafter before a predetermined period of time elapses there is no subsequent handwritten character or image input, CPU 110 may perform step S114 et seq. In other words, in Step S112, CPU 110 may determine whether a period has been input and whether a handwritten image input that is determined to be a period is subsequently not followed by any input for a predetermined period of time or longer.

In that case, if no period has been input or if a handwritten image input that is determined to be a period is subsequently followed by a handwritten image input before the predetermined period of time elapses (NO in Step S112), CPU 110 repeats step S104 et seq. In contrast, if a period has been input and a handwritten image input that is determined to be the period is subsequently not followed by any input for the predetermined period of time or longer (YES in Step S112), CPU 110 performs step S114 et seq.

Thus the present invention provides electronic note 100 such that when electronic note 100 receives a period or a handwritten character (or graphics) of a predetermined shape, electronic note 100 scrolls a screen by a width, as seen in the scroll direction, of an area surrounding a handwritten character input after the immediately previous scroll operation is performed. The user can thus continue to input handwritten characters without moving his/her hand in the scroll direction. This is particularly effective when it is difficult to slide the palm on the surface of touchscreen panel 120. Furthermore, the user no longer needs to input an instruction for scrolling apart from that for inputting a handwritten character. In other words, the user can more easily and less cumbersomely input the instruction for scrolling.

Figure 9:
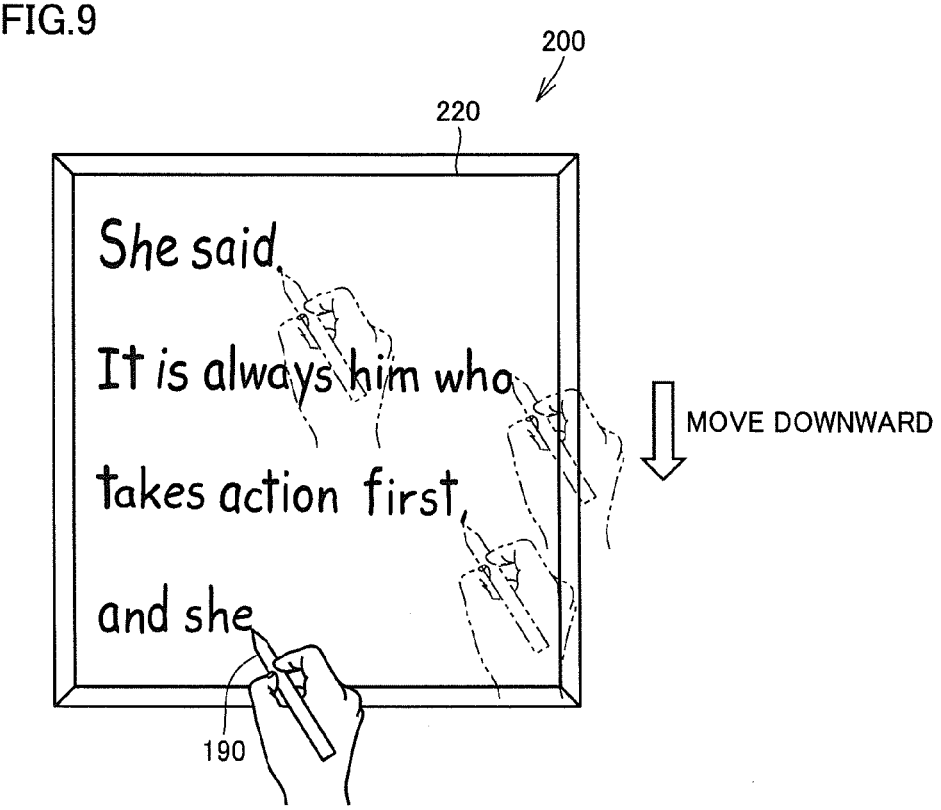
FIG. 9 outlines an operation of an electronic note 200 which does not have a function according to the present embodiment.

Hereinafter, an electronic note which does not have such a function as described above will be described for comparison. FIG. 9 outlines an operation of an electronic note 200 which does not have a function according to the present embodiment. With reference to FIG. 9, electronic note 200 does not perform the scroll process automatically, and accordingly, the user needs to move his/her hand in the scroll direction (or an upward/downward direction) in inputting handwritten characters. Alternatively, the user needs to perform on operation other than inputting handwritten characters to separately input an instruction for scrolling.

<Other Applications>

In the above embodiment, CPU 110 has been described as determining that a handwritten character (or image) of a predetermined shape has been input when a period is handwritten and thus input. However, the predetermined shape is not limited to the period. For example, CPU 110 may determine that a handwritten character (or image) of the predetermined shape has been input when: a comma "," is handwritten and thus input; a period "." or a comma "," is handwritten and thus input; or a predetermined character is handwritten and thus input.

It is needless to say that the present invention is also applicable to a case achieved by supplying a program to a system or a device. Then the present invention's effect can also be exploited in such a manner that external storage medium 141 (or memory 130) having stored therein a program represented by software for achieving the present invention is supplied to the system or the device and that system or device's computer (or CPU, MPU, or the like) reads and executes a program code stored in external storage medium 141 (or memory 130).

In that case, the program code per se read from external storage medium 141 (or memory 130) will implement a function of the embodiment as described above, and external storage medium 141 (or memory 130) that has the program code stored therein will configure the present invention.

Furthermore, it is needless to say that a case is also included in which the program code that the computer has read can be executed to not only implement the function of the embodiment as described above but also allow an operating system (OS) that is operating in the computer to follow the program code's instruction to perform an actual process partially or entirely to thereby implement the function of the embodiment as described above.

Furthermore, it is needless to say that a case is also included in which the program code that is read from external storage medium 141 (or memory 130) is written to another storage medium included in a functionality extension board inserted in the computer, a functionality extension unit connected to the computer or the like and subsequently a CPU or the like included in that functionality extension board or unit follows the program code's instruction to perform an actual process partially or entirely to thereby implement the function of the embodiment as described above.

It should be understood that the embodiments disclosed herein have been described for the purpose of illustration only and in a non-restrictive manner in any respect. The scope of the present invention is defined by the terms of the claims, rather than the description above, and is intended to include any modifications within the scope and meaning equivalent to the terms of the claims.

REFERENCE SIGNS LIST

100: electronic note; 110: CPU; 111: coordinate detection unit; 112: handwriting processing unit; 113: coordinate processing unit; 114: scroll processing unit; 120: touchscreen panel; 121: display; 122: tablet; 130: memory; 131: handwriting data; 132: topmost coordinate data; 133: bottommost coordinate data; 140: memory interface; 141: storage medium; 150: communication interface; 190: stylus pen.

The invention claimed is:

1. An electronic device comprising:
a touchscreen panel; and
a processor for receiving a handwritten character input via said touchscreen panel, and causing said touchscreen panel to display said handwritten character thereon,
in response to a predetermined shape being input via said touchscreen panel, said processor causing said touchscreen panel to scroll a screen by a width, as seen in a scroll direction, of an area surrounding a handwritten character input after an immediately previous scroll operation is performed and before said predetermined shape is input,
wherein:
when said predetermined shape is input, said processor determines whether there is a blank area having said width behind said predetermined shape;
if said blank area having said width is present, said processor scrolls said screen; and
if said blank area having said width is absent, said processor does not scroll said screen.

2. The electronic device according to claim 1, wherein said processor determines that said predetermined shape is input when said processor detects that a period is input.

3. The electronic device according to claim 1, wherein said processor determines that said predetermined shape is input when said processor detects that a comma is input.

4. A handwriting processing method performed in an electronic device including a touchscreen panel and a processor, comprising the steps of:
receiving, by said processor, a handwritten character input via said touchscreen panel;
causing, by said processor, said touchscreen panel to display said handwritten character thereon; and
in response to a predetermined shape being input via said touchscreen panel, causing, by said processor, said touchscreen panel to scroll a screen by a width, as seen in a scroll direction, of an area surrounding a handwritten character input after an immediately previous scroll operation is performed and before said predetermined shape is input,
wherein:
when said predetermined shape is input, said processor determines whether there is a blank area having said width behind said predetermined shape;
if said blank area having said width is present, said processor scrolls said screen; and
if said blank area having said width is absent, said processor does not scroll said screen.

* * * * *